US012187889B2

(12) United States Patent
Chae et al.

(10) Patent No.: US 12,187,889 B2
(45) Date of Patent: Jan. 7, 2025

(54) NON-PAINTED THERMOPLASTIC RESIN COMPOSITION COMPRISING VISCOSE RAYON AND CAPABLE OF EMBODYING MARBLE PATTERN AND MOLDED ARTICLE THEREOF

(71) Applicant: CEPLA CO., LTD., Asan-si (KR)

(72) Inventors: Chang Won Chae, Seoul (KR); Sung Yeon Lee, Seoul (KR); Chang Min Hong, Anyang-si (KR); Jin Young Huh, Goyang-si (KR); Kyu Haeng Cho, Yesan-gun (KR); Dae Keun Kim, Daejeon (KR); Gwang Ho Go, Seoul (KR); Moon Young Lee, Seoul (KR); Hyuk Soo Kwon, Cheonan-si (KR); Hee Jong Park, Incheon (KR); Yeung In Kim, Sejong-si (KR)

(73) Assignee: CEPLA CO., LTD., Asan-si (KR)

( * ) Notice: Subject to any disclaimer, the term of this patent is extended or adjusted under 35 U.S.C. 154(b) by 113 days.

(21) Appl. No.: 17/312,545

(22) PCT Filed: Sep. 23, 2019

(86) PCT No.: PCT/KR2019/012351
§ 371 (c)(1),
(2) Date: Jun. 10, 2021

(87) PCT Pub. No.: WO2020/122379
PCT Pub. Date: Jun. 18, 2020

(65) Prior Publication Data
US 2022/0056264 A1 Feb. 24, 2022

(30) Foreign Application Priority Data

Dec. 12, 2018 (KR) .................. 10-2018-0159835

(51) Int. Cl.
| C08L 69/00 | (2006.01) |
| C08J 5/04 | (2006.01) |
| C08K 7/06 | (2006.01) |
| C08L 1/24 | (2006.01) |
| C08L 55/02 | (2006.01) |

(52) U.S. Cl.
CPC .............. *C08L 69/00* (2013.01); *C08J 5/042* (2013.01); *C08J 5/046* (2013.01); *C08L 1/24* (2013.01); *C08L 55/02* (2013.01); C08L 2205/03 (2013.01); C08L 2205/16 (2013.01)

(58) Field of Classification Search
None
See application file for complete search history.

(56) References Cited

U.S. PATENT DOCUMENTS

| 6,749,932 B1* | 6/2004 | Gould | C08L 101/00 428/323 |
| 2002/0065357 A1* | 5/2002 | Guebitz | C08K 7/06 524/495 |
| 2003/0004233 A1* | 1/2003 | Yamaguchi | C08L 23/10 524/35 |
| 2003/0036598 A1* | 2/2003 | Yamasa | C08K 7/06 524/495 |
| 2016/0111792 A1* | 4/2016 | Katayama | H01Q 1/40 524/495 |

FOREIGN PATENT DOCUMENTS

| CA | 2102047 | * | 5/1994 |
| JP | 2003-128853 A | | 5/2003 |
| JP | 2003128853 | * | 5/2003 |
| KR | 10-2001-0008119 A | | 2/2001 |
| KR | 10-0729957 B1 | | 6/2007 |
| KR | 10-2010-0096301 A | | 9/2010 |
| KR | 10-2011-0057415 A | | 6/2011 |
| KR | 10-1760715 B1 | | 7/2017 |

OTHER PUBLICATIONS

Patwary; Physical and Chemical Properties of Viscose Rayon; Textile Fashion Study (2012) pp. 1-10. (Year: 2012).*
International Searching Authority, International Search Report for PCT/KR2019/012351 dated Jan. 3, 2020 [PCT/ISA/210].

* cited by examiner

*Primary Examiner* — David J Buttner
(74) *Attorney, Agent, or Firm* — Sughrue Mion, PLLC

(57) ABSTRACT

A non-painted thermoplastic resin composition including viscose rayon so as to embody a marble pattern and a method for making it are disclosed. The viscose rayon is included in the thermoplastic resin composition to minimize the deterioration of physical properties while minimizing weld lines and flow marks during an extrusion process, and a luxurious outer appearance of a marble pattern is embodied without additional post-processing or painting process. The non-painted thermoplastic resin composition includes 80-90 parts by weight of a thermoplastic resin composition, 0.1-5 parts by weight of a carbon fiber, and 0.1-3 parts by weight of viscose rayon based on 100 parts by weight of the entire resin composition. The viscose rayon provides an effect of minimizing weld lines and flow marks during injection, improving physical properties, and providing the luxurious appearance of the marble pattern.

18 Claims, No Drawings

NON-PAINTED THERMOPLASTIC RESIN COMPOSITION COMPRISING VISCOSE RAYON AND CAPABLE OF EMBODYING MARBLE PATTERN AND MOLDED ARTICLE THEREOF

CROSS-REFERENCE TO RELATED APPLICATION

This application is a National Stage of International Application No. PCT/KR2019/012351 filed Sep. 23, 2019, claiming priority based on Korean Patent Application No. 10-2018-0159835, filed Dec. 12, 2018, in the Korean Intellectual Property Office, the disclosure of which is incorporated herein in its entirety by reference.

BACKGROUND

1. Field

The present invention provides a non-painted thermoplastic resin composition including viscose rayon so as to embody a marble pattern, and a molded article thereof. Specifically, viscose rayon is included in a thermoplastic resin composition to minimize the deterioration of physical properties while minimizing weld lines and flow marks during an extrusion process, and a luxurious outer appearance of a marble pattern is embodied without any additional post-processing or painting process.

2. Description of Related Art

Thermoplastic resins imparting impact resistance are widely used in interior materials of automobiles, home appliances, and the like. In recent years, products using these resins as a material are required to have high aesthetics such as color and texture in addition to performance such as strength and impact resistance. To this end, techniques for bonding a film to a surface of a molded article after an injection process or molding of a product, or painting, plating, or depositing the molded article using a pigment and an organic solvent are used as techniques known to those of ordinary skill in the art. In recent years, research on reducing time, space, and production costs by mixing and controlling a suitable pigment in a material itself that can replace such post-processing is actively conducted, and there is an increasing need for such materials.

CITATION LIST

Patent Literature (Patent Literature 10) Korean Patent Registration No. 10-1760715 (2017 Jul. 25.)

SUMMARY

The present invention aims to solve the above-described problems of the related art and the technical problems.

The present invention aims to include viscose rayon in a thermoplastic resin composition so as to be used as a non-painting product without any separate post-processing, and prepare an eco-friendly material capable of reducing production costs.

In addition, the present invention aims to provide an outer appearance of a marble pattern during extrusion/injection processes including viscose rayon, while minimizing weld lines and flow marks, minimizing degradation of physical properties, and providing a luxurious outer appearance of a marble pattern.

In order to achieve the above-described objects of the present invention and achieve the characteristic effects of the present invention described below, the characteristic construction of the present invention is as follows.

According to an embodiment of the present invention, a non-painted thermoplastic resin composition includes 80-90 parts by weight of a thermoplastic resin composition, 0.1-5 parts by weight of a carbon fiber, and 0.1-3 parts by weight of a cellulose-based fiber based on 100 parts by weight of the entire resin composition.

In the non-painted thermoplastic resin composition according to the embodiment of the present invention, the cellulose-based fiber is viscose rayon.

The non-painted thermoplastic resin composition according to the embodiment of the present invention embodies a marble pattern.

In the non-painted thermoplastic resin composition according to the embodiment of the present invention, the viscose rayon has a length of 0.5-50 mm.

In the non-painted thermoplastic resin composition according to the embodiment of the present invention, a ratio of a short-direction length to a long-direction length in the viscose rayon is 1:5 to 1:100.

In the non-painted thermoplastic resin composition according to the embodiment of the present invention, the carbon fiber has an average fiber length of 0.1-10 mm.

In the non-painted thermoplastic resin composition according to the embodiment of the present invention, the carbon fiber and the viscose rayon are included in a ratio of 3:1 to 1:3.

In the non-painted thermoplastic resin composition according to the embodiment of the present invention, the thermoplastic resin includes at least one selected from the group consisting of polycarbonate (PC), polystyrene (PS), polyethylene (PE), polypropylene (PP), polyphenylene sulfide (PPS), polyvinyl chloride (PVS), polyamide (PA), acrylonitrile-styrene-acrylate copolymer (ASA), acrylonitrile-butadiene-styrene copolymer (ABS) and polycarbonate (PC)-acrylonitrile-butadiene-styrene copolymer (ABS) alloy (PC/ABS).

In the non-painted thermoplastic resin composition according to the embodiment of the present invention, the non-painted thermoplastic resin composition further includes at least one selected from the group consisting of a hollow inorganic filler, a metal colorant, a metal oxide, an antibacterial agent, an antistatic agent, a conductivity imparting agent, a crosslinking agent, a hydrolysis stabilizer, an antioxidant, an inorganic filler, a lubricant, a coupling agent, and any mixtures thereof.

According to one embodiment of the present invention, provided is a molded article prepared using the above-described non-painted thermoplastic resin composition.

DETAILED DESCRIPTION

The present invention will be described with reference to specific embodiments and the accompanying drawings. The embodiments will be described in detail in such a manner that the present invention may be carried out by those of ordinary skill in the art. It should be understood that various embodiments of the present invention are different, but need not be mutually exclusive. For example, certain shapes, structures, and features described herein may be implemented in other embodiments without departing from the spirit and scope of the present invention in connection with one embodiment. In addition, it should be understood that the locations or arrangement of individual components in the embodiments can be changed without departing from the spirit and scope of the present invention.

Therefore, the following detailed description is not to be taken in a limiting sense, and the scope of the present invention is to be limited only by the appended claims and the entire scope of equivalents thereof, if properly explained.

A non-painted thermoplastic resin composition according to an embodiment of the present invention includes 80-90 parts by weight of a thermoplastic resin composition, 0.1-5 parts by weight of a carbon fiber, and 0.1-3 parts by weight of a cellulose-based fiber based on 100 parts by weight of the entire resin composition. Within the above range, it is possible to obtain excellent tensile strength and excellent durability, compared to the content of the composition. In addition, it is possible to provide the realization of the luxurious outer appearance of the desired marble pattern.

A weight average molecular weight of the thermoplastic resin according to the embodiment of the present invention is provided in a range of 15,000 g/mol to 350,000 g/mol, and preferably 15,000 g/mol to 250,000 g/mol. Within the above range, it is advantageous in processing or molding.

In the non-painted thermoplastic resin composition according to the embodiment of the present invention, the cellulose-based fiber is viscose rayon.

The viscose rayon according to the embodiment of the present invention is a regenerated fiber manufactured by wet-spinning viscose. A certain amount is continuously extruded through a spinning nozzle and solidified in a water bath of sulfuric acid, sodium sulfate, and zinc sulfate. The preparation of artificial fibers originated from artificial silk yarn. In 1898, a viscose method using a reaction of alkali cellulose and carbon disulfide among various preparation methods was invented by C. H. Stern. This method has made much progress because this method is easy and the production costs are low. This method is a technology known for rayon preparation at present.

The non-painted thermoplastic resin composition according to the embodiment of the present invention embodies a marble pattern. Preferably, a non-painted marble pattern is embodied during extrusion, injection, and molding of the thermoplastic resin composition including viscose rayon. Therefore, since there is no separate post-processing, painting, and the like, production costs are reduced and the marble pattern can be embodied. Compared with natural fibers, viscose rayon is effective in reducing production costs because its material is easily deformed and can be produced in large quantities.

In the non-painted thermoplastic resin composition according to the embodiment of the present invention, the viscose rayon has a length of 0.5-50 mm. When the fiber length of the viscose rayon is too short, it may be vulnerable to impact resistance and the embodying of a desired pattern, and when the fiber length is too long, fiber agglomeration may occur.

In the non-painted thermoplastic resin composition according to the embodiment of the present invention, a ratio of a short-direction length to a long-direction length in the viscose rayon is 1:5 to 1:100. Preferably, the ratio is 1:10. Within this range, it helps to improve durability and modulus of elasticity, and the marble pattern is excellently embodied when providing the outer appearance after injection.

In the non-painted thermoplastic resin composition according to the embodiment of the present invention, a carbon fiber and viscose rayon are included in a ratio of 3:1 to 1:3. More preferably, the carbon fiber and the viscose rayon are included in a ratio of 1:1 to 1:2. Within this range, it helps to minimize deterioration of physical properties while providing the most desirable outer appearance in realizing the outer appearance of the molded article of the thermoplastic composition.

In the non-painted thermoplastic resin composition according to the embodiment of the present invention, the carbon fiber has an average fiber length of 0.1-10 mm. The average fiber length is preferably 0.1-10 mm, and more preferably 0.2-5 mm. When the average fiber length is within a range of 0.1-10 mm, sufficient mechanical properties of the molded article can be obtained.

The thermoplastic resin according to the embodiment of the present invention includes at least one selected from the group consisting of polycarbonate (PC), polystyrene (PS), polyethylene (PE), polypropylene (PP), polyphenylene sulfide (PPS), polyvinyl chloride (PVS), polyamide (PA), acrylonitrile-styrene-acrylate copolymer (ASA), acrylonitrile-butadiene-styrene copolymer (ABS) and polycarbonate (PC)-acrylonitrile-butadiene-styrene copolymer (ABS) alloy (PC/ABS). Preferably, polycarbonate (PC)-acrylonitrile-butadiene-styrene copolymer (ABS) alloy (PC/ABS) may be used, but the present invention is not limited thereto.

The polycarbonate (PC)-acrylonitrile-butadiene-styrene copolymer (ABS) alloy (PC/ABS) resin according to the embodiment of the present invention has excellent impact resistance and mechanical properties, excellent dimensional stability, and wide colorability, and is thus widely used as housings of electric and electronic products or automobile parts. The polycarbonate (PC)-acrylonitrile-butadiene-styrene copolymer (ABS) alloy (PC/ABS) may be prepared by techniques well known to those or ordinary skill in the art. A viscosity average molecular weight (Mv) of polycarbonate is provided in a range of 20,000 to 30,000, and a viscosity average molecular weight (Mv) of styrene-acrylate (SAN) used in ABS is 100,000 to 300,000. Within this range there is no problem in flowability, processability, and moldability.

The non-painted thermoplastic resin composition according to the embodiment of the present invention may further include at least one selected from the group consisting of a hollow inorganic filler, a metal colorant, a metal oxide, an antibacterial agent, an antistatic agent, a conductivity imparting agent, a crosslinking agent, a hydrolysis stabilizer, an antioxidant, an inorganic filler, a lubricant, a coupling agent, and any mixtures thereof.

In addition to the composition according to the embodiment of the present invention, an additive may be appropriately added within a range that does not impair physical properties of the molded article. More specifically, the additive may be included in an amount of 0.1-30 parts by weight based on 100 parts by weight of the entire thermoplastic resin composition.

A molded article prepared using the above-described non-painted thermoplastic resin composition according to an embodiment of the present invention is provided. Preferably, in preparing an extruded molded article, in particular a non-painted extruded molded article, a marble pattern is embodied, the generation of weld lines and flow lines are minimized, and deterioration of physical properties is reduced.

Hereinafter, the structures and operations of the present invention will be described in more detail through preferred embodiments of the present invention, so that those of ordinary skill in the art can easily carry out the present invention. However, these example are shown by way of illustration and should not be construed as limiting the present invention in any way.

Since contents not described herein can be sufficiently technically inferred by those of ordinary skill in the art, descriptions thereof will be omitted.

EXAMPLES

Example 1

A thermoplastic resin composition including 98.5 parts by weight of PC/ABS, 0.5 parts by weight of viscose rayon, and 1 part by weight of a carbon fiber was prepared.

Example 2

A thermoplastic resin composition including 96.0 parts by weight of PC/ABS, 1 parts by weight of viscose rayon, and 3 parts by weight of a carbon fiber was prepared.

Example 3

A thermoplastic resin composition including 95.5 parts by weight of PC/ABS, 2 parts by weight of viscose rayon, and 2.5 parts by weight of a carbon fiber was prepared.

Comparative Example 1

A thermoplastic resin composition including 95.5 parts by weight of PC/ABS, 4 parts by weight of viscose rayon, and 0.5 parts by weight of a carbon fiber was prepared.

Comparative Example 2

A thermoplastic resin composition including 93.5 parts by weight of PC/ABS, 0.5 parts by weight of viscose rayon, and 6 parts by weight of a carbon fiber was prepared.

Comparative Example 3

A thermoplastic resin composition including 90 parts by weight of PC/ABS, 4 parts by weight of viscose rayon, and 6 parts by weight of a carbon fiber was prepared.

The thermoplastic resin compositions according to Examples 1 to 3 and Comparative Examples 1 to 3 were prepared according to the amounts of the thermoplastic resin composition, the viscose rayon, and the carbon fiber shown in Table 1. Physical property evaluation was conducted and results thereof are shown in Table 2 below.

TABLE 1

| | Composition ratio (parts by weight) | | |
|---|---|---|---|
| | PC/ABS | viscose rayon | Carbon fiber |
| Example 1 | 98.5 | 0.5 | 1 |
| Example 2 | 96.0 | 1 | 3 |
| Example 3 | 95.5 | 2 | 2.5 |
| Comparative Example 1 | 95.5 | 4 | 0.5 |
| Comparative Example 2 | 93.5 | 0.5 | 6 |
| Comparative Example 3 | 90.0 | 4 | 6 |

<Physical Property Evaluation>
(1) Outer Appearance of Molded Article
The outer appearance of the molded article was visually observed and determined according to the evaluation criteria (the presence or absence of weld lines or flow marks and the degree of embodying of marble pattern), and results thereof are shown in Table 2. The case in which there was no weld line or flow mark and the marble pattern was well embodied was evaluated with a perfect score of 5 points.

5 points: A case in which there is no weld line or flow mark, and the degree of embodying of the marble pattern is very excellent.
 4 points: A case in which there are 1-5 weld lines or flow marks, and the degree of embodying of the marble pattern is excellent.
 3 points: A case in which there are 6-10 weld lines or flow marks, and the degree of embodying of the marble pattern is normal.
 2 points: A case in which there are 10-15 weld lines or flow marks, and the degree of embodying of the marble pattern is insignificant.
 1 point: A case in which there are 15 or more weld lines or flow marks, and the degree of embodying of the marble pattern is poor.

(2) Impact Resistance
Impact strength was measured at room temperature through Notched Charpy test by using ISO 179.
(3) Flexural Modulus
The flexural modulus was measured under a speed condition of 2 mm by using ISO 178.
(4) Flow Index
A melt index (MI) was measured in a condition of 260° C./5 kg by using ISO 1133.

TABLE 2

| | Outer appearance and physical property result value | | | |
|---|---|---|---|---|
| | Outer appearance | Impact resistance (KJ/m$^2$) | Flexural modulus (Mpa) | Flow index (g/10 min) |
| Example 1 | 4 | 51 | 2300 | 20 |
| Example 2 | 5 | 48 | 2390 | 22 |
| Example 3 | 5 | 47 | 2400 | 23 |
| Comparative Example 1 | 5 | 22 | 2360 | 26 |
| Comparative Example 2 | 1 | 34 | 2450 | 17 |
| Comparative Example 3 | 2 | 19 | 2500 | 23 |

From the results of the physical property evaluation in Table 2, it can be confirmed that Examples 1 to 3 had almost no weld lines or flow marks in the outer appearance, and the embodying of the marble pattern was also excellent. It can also be confirmed that physical properties were also improved in the evaluation of flow index, tensile strength, and impact resistance.

That is, the viscose rayon is included in the thermoplastic resin composition to provide the non-painted thermoplastic resin composition capable of minimizing weld lines and flow marks during injection, improving physical properties, providing the luxurious outer appearance of the marble pattern, reducing production cost, and providing the improved molded article.

The viscose rayon is included in the thermoplastic resin composition to provide an effect of minimizing weld lines and flow marks during injection, improving physical properties, and providing the luxurious outer appearance of the marble pattern. More specifically, the present invention provides the non-painted thermoplastic resin composition that embodies the marble pattern on the surface of the injection-molded product including viscose rayon without any separate post-processing, reduces production costs, and provides molded articles with improved physical properties and outer appearance.

Although the present invention has been described with reference to the drawings according to embodiments of the present invention, it will be understood by those of ordinary skill in the art that various applications and modifications can be made thereto without departing from the scope of the present invention.

What is claimed is:

1. A thermoplastic resin composition comprising 95.5-98.5 parts by weight of a thermoplastic resin, 0.5-2 parts by weight of a carbon fiber, and 1-3 parts by weight of viscose rayon based on 100 parts by weight of the entire thermoplastic resin composition,
    wherein the thermoplastic resin is one or more compounds selected from the group consisting of polycarbonate (PC), polystyrene (PS), polyphenylene sulfide (PPS), polyamide (PA), acrylonitrile-styrene-acrylate copolymer (ASA), acrylonitrile-butadiene-styrene copolymer (ABS) and polycarbonate (PC)-acrylonitrile-butadiene-styrene copolymer (ABS) alloy (PC/ABS), and
    wherein the thermoplastic resin composition does not contain polypropylene as a thermoplastic resin.
2. The thermoplastic resin composition of claim 1, wherein the thermoplastic resin composition embodies a marble pattern.
3. The thermoplastic resin composition of claim 1, wherein the viscose rayon has a length of 0.5-50 mm.
4. The thermoplastic resin composition of claim 1, wherein a ratio of a short-direction length to a long-direction length in the viscose rayon is 1:5 to 1:100.
5. The thermoplastic resin composition of claim 1, wherein the carbon fiber has an average fiber length of 0.1-10 mm.
6. The thermoplastic resin composition of claim 1, wherein the carbon fiber and the viscose rayon are included in a ratio of 3:1 to 1:3.
7. The thermoplastic resin composition of claim 1, wherein the thermoplastic resin is polycarbonate (PC)-acrylonitrile-butadiene-styrene copolymer (ABS) alloy (PC/ABS).
8. The thermoplastic resin composition of claim 1, wherein the thermoplastic resin composition further comprises one or more compounds selected from the group consisting of a hollow inorganic filler, a metal colorant, a metal oxide, an antibacterial agent, an antistatic agent, a conductivity imparting agent, a crosslinking agent, a hydrolysis stabilizer, an antioxidant, an inorganic filler, a lubricant, a coupling agent, and any mixtures thereof.
9. A molded article prepared using the thermoplastic resin composition according to claim 1.
10. A molded article prepared using the thermoplastic resin composition according to claim 2.
11. A molded article prepared using the thermoplastic resin composition according to claim 3.
12. A molded article prepared using the thermoplastic resin composition according to claim 4.
13. A molded article prepared using the thermoplastic resin composition according to claim 5.
14. A molded article prepared using the thermoplastic resin composition according to claim 6.
15. A molded article prepared using the thermoplastic resin composition according to claim 7.
16. A molded article prepared using the thermoplastic resin composition according to claim 8.
17. The thermoplastic resin composition of claim 1, wherein the carbon fiber and the viscose rayon are included in a ratio of 1:1 to 1:3.
18. The thermoplastic resin composition of claim 1, wherein the viscose rayon has a length of 0.5-50 mm, and
    a ratio of a short-direction length to a long-direction length in the viscose rayon is 1:5 to 1:10.

* * * * *